United States Patent [19]

Bissett et al.

[11] Patent Number: 5,069,685
[45] Date of Patent: Dec. 3, 1991

[54] TWO-STAGE COAL GASIFICATION AND DESULFURIZATION APPARATUS

[75] Inventors: Larry A. Bissett; Larry D. Strickland, both of Morgantown, W. Va.

[73] Assignee: The United States of America as represented by the United States Department of Energy, Washington, D.C.

[21] Appl. No.: 562,298

[22] Filed: Aug. 3, 1990

[51] Int. Cl.$^5$ .............................. C10J 3/20; C10J 3/84; C10J 3/86
[52] U.S. Cl. .......................................... 48/77; 48/63; 48/76; 60/39.12; 60/39.182; 110/229
[58] Field of Search .................. 48/63, 64, 76, 77, 128; 60/39.12, 39.182; 110/229

[56] References Cited

U.S. PATENT DOCUMENTS

| | | | |
|---|---|---|---|
| 3,454,382 | 7/1969 | Hamilton | 48/76 |
| 3,818,869 | 6/1974 | Blaskowski | 110/229 |
| 3,873,845 | 3/1975 | Osthaus | 48/76 |
| 3,998,608 | 12/1976 | Livemore | 48/128 |
| 4,085,578 | 4/1978 | Kydd | 48/63 |
| 4,088,736 | 5/1978 | Courty et al. | 423/230 |
| 4,132,065 | 1/1979 | McGann | 60/39.12 |
| 4,697,413 | 10/1987 | Pohl | 60/39.12 |
| 4,732,091 | 3/1988 | Gould | 48/76 |
| 4,738,207 | 4/1988 | Moss et al. | 110/229 |
| 4,896,497 | 6/1990 | Pillai | 110/229 |
| 4,917,024 | 4/1990 | Marten | 48/77 |

OTHER PUBLICATIONS

Proceedings Seventh Annual EPRI Contractors' Conference on Coal Gasification, N. Holt, Ap-6007-SR, Oct. 1987.
*Chemistry of Coal Utilization*, M. A. Elliott, 2nd Supplementary Volume, pp. 1620-1621, John Wiley & Sons, New York, N.Y.
*The Chemical Engineer*, The Operation of the Frodingham Desulferising Plant at Exter, A. C. Bureau et al., pp. CE55-CE62, Mar. 1967.
*Coal and Synfuels Technology*, Pasha Publications, Arlington, Va., Feb. 26, 1990, pp. 5 and 6.
*Handbook of Gasifiers and Gas Treatment Systems*, R. D. Parekh, pp. 2A.21-2A.23, WD-TR-82/008-010, U.S. Govt. Printing, 9/62.
*Fourth Annual Pittsburgh Coal Conference*, pp. 497-503, University of Pittsburgh-Dept. of Chemical & Petroleum Engr., 10/87.
*EPRI Journal*, vol. 14, No. 1, pp. 4-15, Jan./Feb. 1989.
*Heat Engineering*, Foster Wheeler Corporation, H. Levy, vol. LIV, No. 2, pp. 2-5, Winter 1990.
1987 *International Conference on Coal Science*, J. A. Mouliin et al., pp. 915-919, Elsevier Science Publications, Amsterdam, Netherlands, 1987.
*Proceedings of the Seventh Annual Gasification and Gas Stream Cleanup Systems Contractors Review Meeting*, M. R. Ghate et al., DOE/METC-87/6079-vol. 1, U.S. Govt. Printing Off., pp. 1-13, 8/87.

*Primary Examiner*—Peter Kratz
*Attorney, Agent, or Firm*—David E. Breeden; Stephen D. Hamel; William R. Moser

[57] ABSTRACT

The present invention is directed to a system which effectively integrates a two-stage, fixed-bed coal gasification arrangement with hot fuel gas desulfurization of a first stream of fuel gas from a lower stage of the two-stage gasifier and the removal of sulfur from the sulfur sorbent regeneration gas utilized in the fuel-gas desulfurization process by burning a second stream of fuel gas from the upper stage of the gasifier in a combustion device in the presence of calcium-containing material. The second stream of fuel gas is taken from above the fixed bed in the coal gasifier and is laden with ammonia, tar and sulfur values. This second stream of fuel gas is burned in the presence of excess air to provide heat energy sufficient to effect a calcium-sulfur compound forming reaction between the calcium-containing material and sulfur values carried by the regeneration gas and the second stream of fuel gas. Any ammonia values present in the fuel gas are decomposed during the combustion of the fuel gas in the combustion chamber. The substantially sulfur-free products of combustion may then be combined with the desulfurized fuel gas for providing a combustible fluid utilized for driving a prime mover.

12 Claims, 1 Drawing Sheet

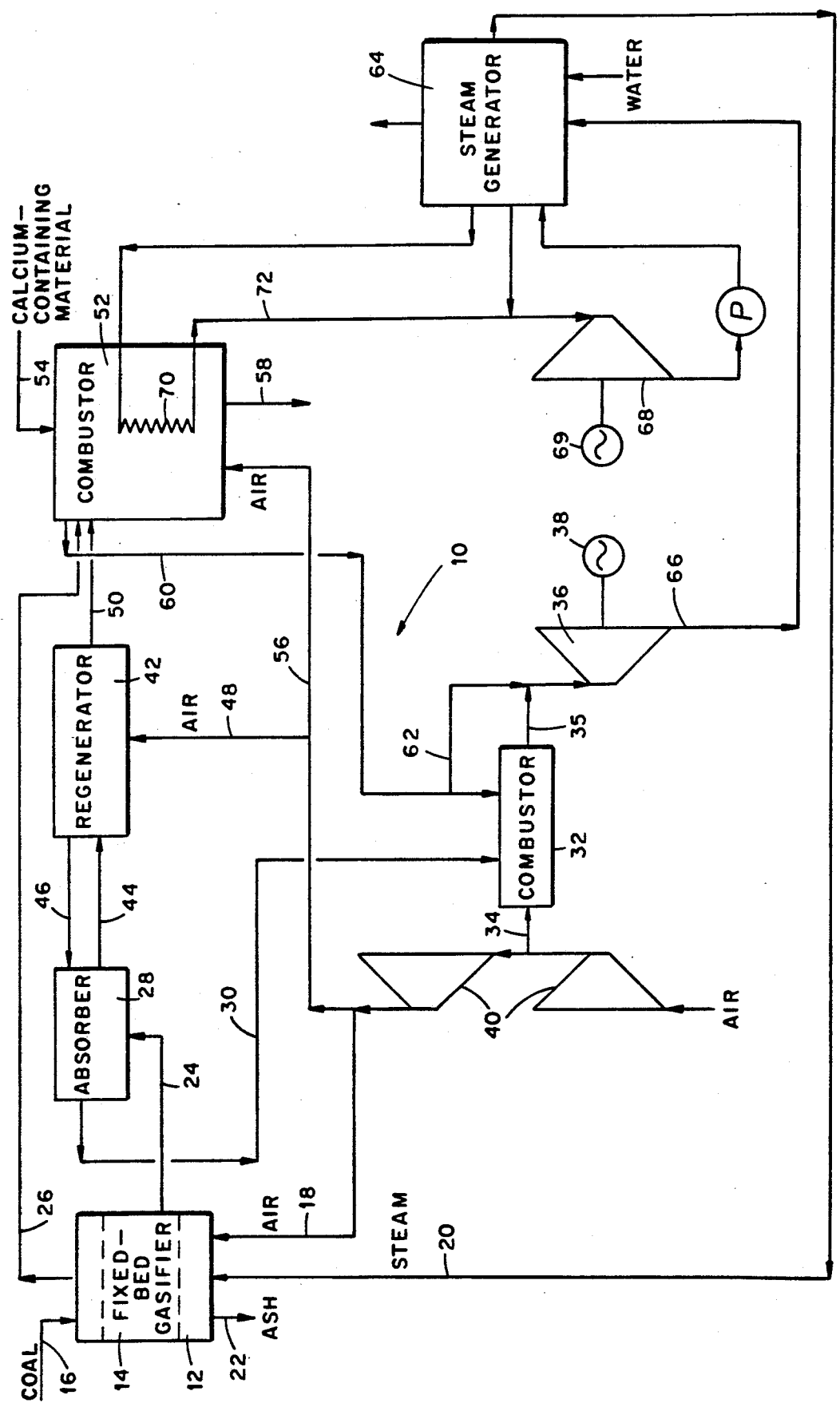

TWO-STAGE COAL GASIFICATION AND DESULFURIZATION APPARATUS

BACKGROUND OF THE INVENTION

The present invention relates generally to the production of fuel gas by the gasification of coal and the desulfurization of the fuel gas prior to the use thereof in a power utilization device. More particularly, the Present invention relates to production of fuel gas in a two-stage, fixed-bed gasifier with desulfurization of a first stream of fuel gas from the gasifier and the combustion of a second stream of fuel gas from the gasifier in a combustion device to treat sulfur sorbent regeneration gas resulting from the desulfurization of the first stream of fuel gas.

Fuel gas derived from the gasification of coal has been found to be useful as a combustible medium in many applications and processes. Of particular interest is the use of fuel gas in integrated gasification combined cycle systems which offer substantial advantages over many presently known power generating systems. Of the various types of gasifiers, such as entrained bed, fluidized bed, and fixed bed gasifiers, which can be used to provide fuel gas in such combined cycle systems, the fixed-bed gasifier appears to be a promising candidate. Fixed-bed gasifiers have many desirable features, but they also have several attendant shortcomings or drawbacks which detract from their usefulness in such combined cycle systems. For example, single-stage, fixed-bed gasifiers require the use of a sized coal feed in order to limit the quantity of fines that are discharged from the gasifier with the fuel gas. Also, fuel gases discharged from such fixed-bed gasifiers contain considerable amounts of tars, light oils, and ammonia which present environmental and equipment problems when used. Further, in order to meet environmental emission standards and to protect power generating devices, sulfur species, such as hydrogen sulfide and carbonyl sulfide, released from sulfur-containing coal during the gasification thereof must be essentially removed from the fuel gas prior to its utilization by employing a suitable desulfurization process such as one using a regenerable solid sulfur sorbent. In such instances, it is frequently desirable from the standpoint of sulfur-sorbent cost and availability to employ a sorbent which can be regenerated and recycled in the desulfurization process for reuse in sulfur removal operations. Regeneration of sulfur-containing sorbents may be achieved by contacting the sulfur-containing sorbent with a regenerating gas such as air so that the oxygen in the air can react with the captured sulfur species to convert them to sulfur oxides. During this regeneration, the converted sulfur species in the sorbent are released from the sorbent into the regeneration gas. This regeneration gas must then be treated to remove the sulfur oxides such as by converting them to environmentally acceptable forms of solid compounds which may be safely discharged into the environment. The satisfactory treatment of the regeneration gas containing the sulfur oxides is one of the principal problems associated with hot-gas desulfurization technology.

SUMMARY OF THE INVENTION

A primary aim or objective of the present invention is to provide for effectively integrating a two-stage, fixed-bed coal gasification unit with hot-gas desulfurization of a first hot fuel gas stream in a regenerable sorbent bed and the combustion of a second fuel gas stream from the gasifier in the presence of a calcium-containing material for treating tail gas comprising the residual regeneration gas and sulfur oxides released during sorbent regeneration as well as tar, ammonia, and sulfur species in the second fuel gas stream. The present system substantially reduces or obviates many problems and shortcomings previously encountered in the operation of known fixed-bed gasifiers and provides a system which can operate at higher efficiencies with lower sulfur and nitrogen oxide emissions than previously attainable in known fixed-bed gasification systems. Generally, these and other objectives of the present invention are achieved by employing a two-stage coal gasification and sulfur treatment system which comprises a fixed-bed gasifier, a sulfur sorbing means, and a fuel gas combustion means. A first conduit means is in registry with the gasifier at a location therein overlying the fixed bed and is coupled to the combustion means for conveying a stream of tar- and sulfur-bearing fuel gas into the combustion means for the combustion thereof. Sulfur-sorbing means, containing regenerable sulfur-sorbing material, are placed in registry with the fixed bed in the gasifier by the second conduit means which conveys a stream of sulfur-bearing fuel gas from the bed in the gasifier for contact with the sulfur-sorbing material to extract sulfur species from the fuel gas. A third conduit means is coupled to the combustion means and is adapted to convey a stream of sorbent regenerating gas sequentially through the sulfur-sorbing material containing the extracted sulfur species for producing gaseous sulfur oxides and into the combustion means. Means are provided for introducing a calcium-containing compound into the combustion means for reacting with sulfur species within the fuel gas conveyed into the combustion means by the first conduit means and with sulfur oxides in the sorbent regenerating gas.

In the present invention, fuel gas utilization means can be adapted to receive a stream of hot, substantially sulfur-free fuel gas from the sulfur-sorbing means as well as a stream of hot, substantially sulfur-free combustion products from the combustion means.

Other and further objects of the present invention will become obvious upon an understanding of the illustrative embodiment about to be described or will be indicated in the appended claims and various advantages not referred to herein will occur to one skilled in the art upon employment of the invention in practice.

DESCRIPTION OF THE DRAWING

The Figure is a schematic block diagram showing generally a two-stage, fixed-bed gasifier and fuel gas treatment system arranged in accordance with the present invention as utilized in a power utilization system incorporating a gas turbine and other components as commonly found in combined cycle systems for the generation of electrical power.

A preferred embodiment of the invention has been chosen for the purpose of illustration and description. The preferred embodiment illustrated is not intended to be exhaustive nor to limit the invention to the precise form disclosed. The embodiment illustrated is chosen and described in order to best explain the principles of the invention and their application and practical use to thereby enable others skilled in the art to best utilize the invention in various embodiments and modifications that are best adapted to the particular use contemplated.

For example, the two-stage fixed-bed, coal gasification arrangement along with the associated desulfurization of fuel gas and the treatment of the sulfur sorbent regeneration gas in a fuel gas fired combustion chamber can be used to provide a stream of substantially sulfur-free fuel gas to various heat utilizing systems as well as a stream of substantially sulfur-free combustion products which may be used in combination with the fuel gas and/or as a heat exchange medium.

DETAILED DESCRIPTION OF THE INVENTION

As briefly described above the present invention is directed to a coal gasification system comprising a combination of interacting components which together are capable of providing a stream of substantially sulfur-free fuel gas and a stream of substantially sulfur-free gaseous combustion products to a fuel gas utilization system such as a gas turbine arrangement utilized in an electrical power generating system as will be described below. While producing these substantially sulfur-free gas streams, the present invention also provides for converting sulfur species in the fuel gas to environmentally acceptable products. Generally, the present invention is practiced by gasifying coal containing sulfur species in a two-stage, fixed-bed gasifier and provides a first stream of substantially desulfurized fuel gas and the stream of combustion products produced by the combustion of a tar-, ammonia- and sulfur-bearing second stream of fuel gas taken from an upper stage of the gasifier in the presence of sulfur sorbent regeneration gases supporting sulfur oxides and a calcium-containing material.

To provide the first stream of fuel gas, a portion of the fuel gas generated in the gasifier is withdrawn from a location within the fixed bed of the gasifier and contacted with a regenerable solid sorbent material for removing sulfur species from the withdrawn portion of fuel gas. The sulfur-containing sorbent material resulting from the contact with the portion of fuel gas is, in turn, contacted with a stream of oxygen-containing sorbent regeneration gas at a sufficient temperature for regenerating the sorbent material and providing a stream of residual regeneration gas containing sulfur oxides. A stream of tar-, ammonia- and sulfur-containing fuel gas is withdrawn from the gasifier at a location overlying the fixed bed and then combusted in the presence of the residual regeneration gases and a calcium-containing material to provide a stream of combustion products substantially free of tar, ammonia, and sulfur.

The present invention is shown incorporated in an integrated gasification combined cycle arrangement generally shown at 10, as used to generate electrical power. However, it is to be understood that the system of the present invention may be readily employed to provide hot, sulfur-clean fuel gas and combustion products in other applications such as for process heating and steam production. As shown in the Figure, a gasifier 12 contains a fixed bed 14 and provides a two-stage gasification arrangement for producing fuel gas streams at a pressure in a range of from about atmospheric to 600 psi, preferably in the range of about 200 to 600 psi. Coal introduced into the gasifier 12 through line 16 usually contains about 0.5 to 7 percent sulfur and is in a size range of about 2×0 inch, i e., size 2 inches and under. The present invention is able to utilize coal without the strict sizing requirements heretofore needed for the control of fine particle emission in fixed-bed gasifiers. The coal introduced through line 16 enters the top of the fixed bed 14 and moves downwardly through the bed 14 during the gasification of the coal. Air and steam are introduced into the base of the gasifier 12 through lines 18 and 20, respectively, to provide for the gasification of the coal in a reducing atmosphere so as to produce fuel gas which is particularly suitable for combustion purposes in a combustion arrangement such as used in an integrated gasification combined cycle system. Solid waste or ash resulting from the gasification of the coal is discharged from the gasifier through line 22.

The two-stage fixed-bed gasifier is characterized by providing two Product gas or fuel gas streams. The first fuel gas stream is taken from the lower stage of the gasifier 12 at a point within the fixed bed through line or conduit 24 with the volume of this stream representing about 50 to 80 percent of the total fuel gas produced in the gasifier 12. The temperature of the first fuel gas stream is in a range from about 1000° F. to 1600° F. The second stream representing the balance of the fuel gas is removed from the upper stage of the gasifier 12 through line or conduit 26 after passing through the bed 14. The upper stage fuel gas heats and endothermically reacts with the coal being fed into gasifier 12 through line 16 and is normally about 400° to 1000° F. cooler than the lower stage gas. Since coal devolatization occurs primarily in the upper stage, most of the volatile products including tars, ammonia, and light oils are concentrated in the fuel gas stream discharged from the upper stage of the two-stage coal gasifier. The ratio of the fuel gas withdrawn from the lower stage to that of the upper stage and the gas temperatures of the fuel gas streams exiting from the gasifier can be readily varied and are dependant upon several factors including the properties of the coal being utilized and the characteristics desired for the two fuel gas streams being withdrawn from the gasifier.

The fuel gas stream removed from the lower stage of the gasifier through conduit 24 contains sulfur species primarily in the form of hydrogen sulfide and carbonyl sulfide. This stream of fuel gas is transported through line 24 to a fuel-gas desulfurization contactor or absorber, generally shown at 28, where the necessary amount of the sulfur species is removed from the fuel gas. These sulfur species are preferably removed in a suitable hot-gas desulfurization absorber 28 operating at temperatures in a range of about 800° to 1500° F. Satisfactory removal of the sulfur from hot fuel gas has been achieved by using particulate sorbent materials such as iron-oxide, zinc-oxide, zinc-ferrite, zinc-titanate, and combinations thereof in absorbers containing fixed-bed, moving-bed, or fluidized-bed arrangements. Depending on optimum temperatures in the two-stage gasifier and the regenerable solid sorbent material employed, the fuel gas stream from the lower stage of the gasifier may need to be cooled by, for example, indirect heat exchange or by water injection prior to introduction into the absorber. The substantially sulfur-free fuel gas discharged from the absorber 28 is shown being conveyed via conduit 30 to a combustor 32 where the fuel gas is burned in the presence of air admitted through line 34 to provide a stream of hot gaseous combustion products through discharge conduit 35 for driving a gas turbine as shown at 36 and as commonly used in a typical integrated gasification combined cycle system. The turbine 36 is shown driving an electrical generator 38 as well as a compressor arrangement 40 which is utilized to supply air to the gasifier through line 18, air to the combustor 32 through line 34, and air to other system components as will be described below.

As illustrated in the Figure, the fuel-gas desulfurization arrangement utilized employs a moving-bed or a fluidized-bed type absorber 28 wherein the sulfur-bearing sorbent or sulfided sorbent is withdrawn from the absorber 28 and conveyed to a regenerator 42 through line 44. In the regenerator 42 the sulfided sorbent is regenerated to reactivate its sulfur-sorbing capacity by contacting the sulfided sorbent with a hot stream of regeneration gas. The regenerated sorbent is returned to the absorber 28 through line 46. Note that fixed bed desulfurization may also be used wherein beds are alternated between absorption and regeneration service and that this invention is not limited by choice of desulfurization process.

The regeneration gas used for the regeneration of the sorbent in the regenerator 42 is usually air which may be diluted with another suitable gas so as to satisfactorily regulate the exothermic regeneration operation. The air is normally admitted into the regenerator at a temperature in a range of about 600° to 1400° F. in order to initiate the exothermic reaction with the sulfur species contained on the sorbent. During this reaction sulfur in the sulfided sorbent is released into the regeneration gas as sulfur oxides, primarily sulfur dioxide and sulfur trioxide. The regeneration gas may be readily supplied to the regenerator 42 in the illustrated system by diverting a portion of the air from the compressor arrangement 40 through line 48. The heating of this air stream being conveyed through line 48 may be achieved by utilizing the heat of compression together with a heat exchange arrangement using heat generated in the fuel gas combustor 32 or by the combustion of the fuel gas from the upper stage of the gasifier as will be described below.

In accordance with the present invention, the sorbent regeneration tail gas comprising the residual regeneration gas and the sulfur oxides supported thereby is conveyed through line 50 into a combustion chamber 52 where the sulfur oxides are reacted in the presence of a calcium-containing material, such as calcium oxide or calcium carbonate, introduced into the combustion chamber 52 through line 54 to convert the sulfur oxides to an environmentally stable compound such as calcium sulfate. In order to provide for a satisfactory reaction between the sulfur oxides and the calcium-containing material, a reaction temperature in the range of about 1500° to 1750° F. is needed. While the regeneration gas emerging from the regenerator 42 does contain some heat values and is normally of a temperature at about 1100° to 1500° F., this level of heat is insufficient to effect a viable sulfur-compound forming reaction in the combustion chamber 52 especially since considerable heat is used to heat the normally room-temperature calcium-containing material being introduced into the combustion chamber 52 through line 54. As provided by the present invention, the heat energy required for a suitable sulfur converting reaction with the calcium-containing material in the combustion chamber 52 is provided by combusting sulfur-ammonia- and tar-laden fuel gas taken from the upper stage of the gasifier 12. This fuel gas generated in the upper stage of the gasifier 12 is conveyed through conduit 26 to the combustion chamber 52 where it is burned in the presence of excess air such as provided by the compressor 40 through line 56 to produce the heat energy necessary for the reaction and the heating of the reaction constituents. During this combustion of the fuel gas, the ammonia values in the fuel gas formed in the upper stage of the gasifier 62 are decomposed to inhibit the formation of nitrogen oxide compounds in the gases discharged from the combustion chamber 52. Further, the tars and light oils are successfully burned in the combustion chamber 52 while the sulfur values in the upper stage fuel gas are reacted with the calcium-containing materials to form environmentally stable calcium compounds.

The ammonia values, tars and light oils as would be present in fuel gas removed from the top of a single-stage, fixed-bed gasifier, are essentially absent from the lower stage fuel gas removed from a location within the vertically extending fixed bed 14 of the two-stage gasifier 12. Also, the lower stage fuel gas typically contains little or no sulfur bound with tars and oils. This is a particular advantageous feature of the present invention since sulfur bound with tars and oil is not readily removed from the fuel gas by contact with regenerable solid sulfur sorbents, as described above, and also causes some deposition of soot on the sorbent so as to substantially detract from its effectiveness. The sulfur species in the upper stage fuel gas such as hydrogen sulfide and carbonyl sulfide, including those bound with the tars and oils, are converted to sulfur oxides in the combustion chamber 52. These sulfur oxides, as well as those in the regeneration tail gas, react with the calcium-containing material and are converted to stable calcium-sulfur compounds. These calcium-sulfur compounds are discharged from the combustion chamber 52 through discharge line 58.

Another feature of the present invention is that since the gaseous products of combustion discharged from the combustion chamber 52 through line 60 are essentially free of any environmental polluting sulfur species, nitrogen oxides, tars, and oils, and are at a temperature essentially corresponding to that of the combustion chamber, i.e., about 1500° to 1750° F., they are particularly useful as a driving fluid in a prime mover such as the turbine 36. This stream of gaseous combustion produces from the combustion chamber 52 may be readily utilized to augment the stream of combustion products discharging from combustor 32 to the turbine 36. As shown, the line 60 conveying the combustion products from the combustion chamber 52 is coupled to the combustor 32 in such a manner that these combustion products may be either mixed with the desulfurized gas from the lower stage of the gasifier and fired together in the turbine combustor 32, or alternatively, be mixed through line 62 with the combustion products from the burning of the lower stage fuel gas at a location in a conduit 35 immediately downstream of the turbine combustor 32. Various combinations of blending the combustion gases from combustion chamber 52 with fuel gas from the lower stage may be employed to achieve suitable combustion gas temperatures for utilization in the gas turbine 36. As shown in the Figure, residual heat in the gases discharged from the turbine 36 may be recovered in a suitable heat exchange arrangement. For example, as shown in the Figure, a steam generator 64 is adapted to receive the gas emerging from the turbine 36 through line 66 for extracting heat remaining in the gases prior to exhausting these gases to the atmosphere. The steam from the steam generator can be blended with the combustion gases fed into the gas turbine 36 and/or used to drive a steam turbine 68 which is shown coupled to a generator 69. Depending upon the volume of fuel gas flow taken from the lower stage of the gasifier 12, the heat energy available from the combustion of the upper stage fuel gas in the combustion chamber 52 may exceed the heat energy requirements needed for the reaction between the sulfur oxides and the calcium-containing compound and the decomposition or burning of the tars, ammonia and other environmentally contaminating species. This excess heat energy may be used in various ways such as for preheating the air in any of the lines 18, 34, 48, and 56 and/or for generating steam through a heat exchange arrangement 70 shown in the combustion chamber 52 and coupled to steam generator 64 and the steam turbine 68 through line 72.

The combustion chamber 52 utilized for the burning of the upper stage fuel gas in the presence of the calcium-containing compound and the regeneration tail gas may be of any suitable type which will satisfactorily provide the desired reactions and combustion. The use of a pressurized, fluidized bed-type combustor is preferred since excess heat energy can be more readily managed and utilized. Since a considerable portion of the sulfur from the gasification process is concentrated by the desulfurization-regeneration operation and this sulfur concentration is essentially always in the gas phase, the reactions with the calcium-containing compound are facilitated. This advantage is not available in other types of combustors in which sulfur is released from a burning solid moving throughout the bed. Thus, in the present invention, the net result is a lower overall calcium-sulfur ratio requirement for the same degree of sulfur removal.

It will be seen that the present invention provides for a higher level of sulfur removal from fuel gas than obtainable by practicing previous fixed-bed gasification techniques since the sulfur values associated with tars and oils, which comprise up to about 8% of the total sulfur in the coal, are reacted in the combustion chamber in the presence of the calcium-containing material. Another advantage of the present invention is that the ammonia in the fuel gas from the upper stage of the gasifier is decomposed in the combustion chamber to significantly inhibit the emission of deleterious nitrogen oxides so as to substantially reduce or eliminate the need for developing low nitrogen oxide emitting combustors and/or the requirement for controls over the combustion products released from such combustors.

When calcium-containing materials were previously employed directly to remove sulfur species from fuel gas, the calcium compound formed was normally in the form of calcium sulfide which is unsuitable for disposal into the environment without further oxidation. Attempts to achieve further oxidation in previous practice were not particularly successful since the sulfur oxides tended to evolve during oxidation so as to produce a tail gas treatment problem and since some calcium sulfide tended to persist in the core of calcium sulfate particles. These problems are avoided by the practice of the present invention through the use of calcium-containing materials such as calcium-oxide and calcium carbonate which are ideally suited for oxidizing conditions in the air rich combustion chamber and by using regenerable desulfurization sorbents which are suited for the reducing conditions found in the fuel-rich fuel gas derived from the lower stage. This two-fold technique provided by the present invention significantly reduces the possibility of producing environmentally hazardous gaseous or solid waste.

Normally, for a given coal input into a gasifier, the gas velocities in the upper stage of a two-stage fixed gasifier are lower than those encountered in a single stage gasification unit so that fines carryover, a traditional problem for fixed bed gasifiers, is substantially reduced so as to ease the requirements for sized coal as the feedstock. In fact, it is believed that the present invention may be practiced by utilizing run-of-mine type coal.

What is claimed is:

1. A coal gasification system comprising a fixed-bed gasifier, combustion means, first conduit means in registry with said gasifier at a location therein overlying the fixed bed in the gasifier and coupled to said combustion means for conveying a stream of tar- and sulfur-containing fuel gas into said combustion means, means for introducing air into said combustion means for the combustion of the fuel gas therein, sulfur sorbing means containing regeneratable sulfur-sorbent material, second conduit means in registry with the fixed bed in the gasifier at a location underlying the first mentioned location and with said sulfur sorbing means for conveying a stream of sulfur-bearing fuel gas into contact with the sulfur-sorbent material for extracting sulfur species from the sulfur-bearing fuel gas, sorbent regenerating means adapted to receive sulfur-sorbent material containing the extracted sulfur species, third conduit means adapted to convey a stream of sorbent regenerating gas into said sorbent regenerating means and through sulfur sorbent material therein containing the extracted sulfur species for producing gaseous sulfur oxides by the regeneration of the sulfur-sorbent material and receiving therein said gaseous sulfur oxides, fourth conduit means adapted to convey the stream of sorbent regeneration gas and sulfur oxides received therein from said sorbent regenerating means into said combustion means, and means for introducing a calcium-containing compound into said combustion means for reacting with sulfur species within the fuel gas conveyed into said combustion means by the first conduit means and with sulfur oxides received by the sorbent regenerating gas.

2. A coal gasification system as claimed in claim 1, further including fuel gas utilization means and means for supplying the latter with substantially sulfur-free fuel gas from said sulfur-sorbing means.

3. A coal gasification system as claimed in claim 2, wherein means are provided for supplying said fuel gas utilization means with substantially sulfur-free combustion products from said combustion means.

4. A coal gasification system for producing fuel gas by the gasification of coal containing sulfur species, comprising vertically oriented gasifier means for producing fuel gas by the gasification of coal contained within a bed in the gasifier means, conduit means in registry with the bed in the gasifier means for removing a portion of said fuel gas, absorber means containing sulfur sorbent material coupled to said conduit means for receiving said portion of fuel gas and removing sulfur species therefrom, fuel gas utilization means coupled to said absorber means for receiving and using therein a stream of desulfurized fuel gas therefrom, sorbent regenerating means adapted to receive sulfur-sorbent material containing sulfur species removed from said portion of fuel gas, means for conveying a stream of oxygen-containing regeneration gas into said sorbent regenerating means and into contact with sulfur-sorbing material containing sulfur species removed from said portion of fuel gas for regenerating said sulfur-sorbing material and producing gaseous sulfur oxides supported by the regeneration gas, combustion means adapted to receive the stream of regeneration gas supporting the sulfur oxides, means for conveying air into said combustion means, further conduit means in registry with said gasifier means at a location overlying the coal-containing bed for conveying ammonia-, tar- and sulfur-bearing fuel gas from said gasifier to said combustion means for the production of a stream of substantially ammonia- and tar-free combustion products formed by the combustion of the ammonia-, tar- and sulfur-bearing fuel gas in the presence of the regeneration gas supporting the sulfur oxides, and means for conveying calcium-containing material into said combustion means for reacting with and removing from the stream of combustion products sulfur species contained in said ammonia, tar- and sulfur-bearing fuel gas and sulfur oxides supported by the regeneration gas.

5. A coal gasification system as claimed in claim 4, wherein said fuel gas utilization means comprises combustor means for the combustion of said portion of the fuel gas to provide a further stream of combustion products.

6. A coal gasification system as claimed in claim 5, wherein said fuel gas utilization means include prime mover means adapted receive and be driven by said further stream of combustion products.

7. A coal gasification system as claimed in claim 6, wherein still further conduit means convey the first mentioned stream of combustion products from said combustion means to said fuel gas utilization means.

8. A coal gasification system as claimed in claim 7, wherein at least a portion of the stream of combustion products conveyed from said combustion means are conveyed into said combustor means for admixture with said further stream of combustion products.

9. A coal gasification system as claimed in claim 7, wherein at least a portion of the stream of combustion products conveyed from said combustion means are conveyed to said prime mover means for admixture with said further stream of combustion products.

10. A coal gasification system as claimed in claim 4, wherein the bed containing the coal within the gasifier means is a fixed, vertically extending bed, wherein the first mentioned conduit means are in registry with said fixed bed at a location intermediate upper and lower surfaces thereof.

11. A coal gasification system as claimed in claim 4, wherein heat exchange means are in registry with said combustion means for withdrawing heat therefrom.

12. A coal gasification means as claimed in claim 4, wherein said combustion means comprises a fluidized bed combustor.

* * * * *